(12) United States Patent
Li et al.

(10) Patent No.: US 9,363,037 B2
(45) Date of Patent: Jun. 7, 2016

(54) LINK ADAPTATION FEEDBACK METHOD AND TRANSMITTING DEVICE

(71) Applicant: Huawei Technologies Co., Ltd., Shenzhen (CN)

(72) Inventors: Yunbo Li, Shenzhen (CN); Xun Yang, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/741,001

(22) Filed: Jun. 16, 2015

(65) Prior Publication Data

US 2015/0280858 A1 Oct. 1, 2015

Related U.S. Application Data

(63) Continuation of application No. 14/155,114, filed on Jan. 14, 2014, now Pat. No. 9,094,187, which is a continuation of application No. PCT/CN2012/073000, filed on Mar. 26, 2012.

(30) Foreign Application Priority Data

Jul. 15, 2011 (CN) .......................... 2011 1 0199393
Jul. 27, 2011 (CN) .......................... 2011 1 0213392

(51) Int. Cl.
*H04L 1/02* (2006.01)
*H04L 1/00* (2006.01)
(Continued)

(52) U.S. Cl.
CPC ............ *H04L 1/0009* (2013.01); *H04B 7/0417* (2013.01); *H04L 1/0003* (2013.01); *H04L 1/0025* (2013.01); *H04L 1/0028* (2013.01); *H04L 1/0643* (2013.01); *H04L 1/0681* (2013.01)

(58) Field of Classification Search
CPC ................................ H04B 7/063; H04L 5/003
USPC ........... 375/267, 295, 340, 260; 370/328, 329
See application file for complete search history.

(56) References Cited

U.S. PATENT DOCUMENTS

2007/0129018 A1   6/2007  Trainin et al.
2007/0195811 A1   8/2007  Basson
(Continued)

FOREIGN PATENT DOCUMENTS

| CN | 101361308 A | 2/2009 |
| CN | 101873294 A | 10/2010 |
| CN | 102045096 A | 5/2011 |

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Std 802.11 n™-2009, IEEE Computer Society, New York, New York (Oct. 29, 2009).
(Continued)

*Primary Examiner* — Khai Tran
(74) *Attorney, Agent, or Firm* — Leydig, Voit & Mayer, Ltd.

(57) ABSTRACT

Embodiments of the present disclosure provide a link adaptation feedback method, including: receiving, by a device, a link adaptation feedback frame sent by a communication peer end, where the link adaptation feedback frame includes a modulation and coding scheme request sequence identifier (MSI), where the MSI is configured to indicate space-time block coding type information.

16 Claims, 4 Drawing Sheets

| B0 | B1 | B2 | B3 B5 | B6 B8 | B9 B23 | B24 B26 | B27 | B28 | B29 | B30 | B31 |
|---|---|---|---|---|---|---|---|---|---|---|---|
| VHT=1 | Reserved | MRQ | MSI | MFSI/GID-L | MFB | GID-H | Coding type | FB Tx Type | Unsolicited MFB | AC constraint | RDG/More PPDU |
| Bit: 1 | 1 | 1 | 3 | 3 | 15 | 3 | 1 | 1 | 1 | 1 | 1 |

(51) Int. Cl.
*H04L 1/06* (2006.01)
*H04B 7/04* (2006.01)

(56) References Cited

U.S. PATENT DOCUMENTS

| | | | |
|---|---|---|---|
| 2012/0236971 A1* | 9/2012 | Taghavi Nasrabadi | H04L 27/2628 375/340 |
| 2012/0257605 A1 | 10/2012 | Abraham et al. | |
| 2012/0269183 A1* | 10/2012 | Sohn | H04L 1/0025 370/338 |
| 2013/0235836 A1* | 9/2013 | Roh | H04L 1/0031 370/329 |
| 2013/0294397 A1* | 11/2013 | Lee | H04B 7/063 370/329 |
| 2014/0105200 A1 | 4/2014 | Seok | |
| 2014/0112183 A1 | 4/2014 | Yang et al. | |
| 2015/0139119 A1* | 5/2015 | Azizi | H04W 72/1278 370/329 |

OTHER PUBLICATIONS

"Draft STANDARD for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6 GHz," IEEE P802.11ac™/D1.0, IEEE, New York, New York (May 2011).

Li et al., "Distributed scheduling algorithm for multiuser MIMO downlink with adaptive feedback," Journal of Jilin University (Engineering and Technology Edition), vol. 41, No. 2, pp. 514-519, China Academic Journal Electronic Publishing House (Mar. 2011).

Office Action in corresponding U.S. Appl. No. 14/155,114 (Nov. 5, 2014).

* cited by examiner

| B0 | B1 | B2 | B3 B5 | B6 B8 | B9 B23 | B24 B26 | B27 | B28 | B29 | B30 | B31 |
|---|---|---|---|---|---|---|---|---|---|---|---|
| VHT=1 | Reserved | MRQ | MSI | MFSI/GID-L | MFB | GID-H | Coding type | FB Tx Type | Unsolicited MFB | AC constraint | RDG/More PPDU |
| Bit: 1 | 1 | 1 | 3 | 3 | 15 | 3 | 1 | 1 | 1 | 1 | 1 |

FIG. 1

| B0 | B1 | B2 | B3 B5 | B6 B8 | B9 B23 | B24 B26 | B27 | B28 | B29 | B30 | B31 | B32 |
|---|---|---|---|---|---|---|---|---|---|---|---|---|
| VHT=1 | Extended | MRQ | MSI | MFSI/GID-L | MFB | GID-H | Coding type | FB Tx Type | Unsolicited MFB | AC constraint | RDG/More PPDU | ... |
| Bit: 1 | 1 | 1 | 3 | 3 | 15 | 3 | 1 | 1 | 1 | 1 | 1 | X |

FIG. 2

LINK ADAPTATION FEEDBACK METHOD AND TRANSMITTING DEVICE

CROSS-REFERENCE TO RELATED APPLICATIONS

This application is a continuation of U.S. patent application Ser. No. 14/155,114 filed on Jan. 14, 2014, which is a continuation of International Patent Application No. PCT/CN2012/073000, filed on Mar. 26, 2012, which claims priority to Chinese Patent Application No. 201110199393.X, filed on Jul. 15, 2011 and Chinese Patent Application No. 201110213392.6, filed on Jul. 27, 2011. The afore-mentioned patent applications are hereby incorporated by reference in their entireties.

TECHNICAL FIELD

Embodiments of the present disclosure relate to the field of communication technologies and, in particular, to a link adaptation feedback method and a transmitting device.

BACKGROUND

The physical layer of a wireless local area network supports a link adaptation technology (Link Adaptation). The main procedure of the link adaptation technology is as follows: after a transmitter sends data to a user by using a certain modulation and coding scheme (Modulation and Coding Scheme, MCS), due to the impact of channel conditions, and because a receiver can estimate actual channel state information, the receiver calculates parameters such as the parameters related to the channel conditions and the recommended MCS according to the channel conditions and transmission conditions (for example, the MCS) after receiving the data, and feeds back the parameters to the transmitter. After obtaining the parameters fed back by the receiver, the transmitter adjusts and selects a proper modulation and coding scheme to reduce the bit error rate of data transmission. The process of adjusting the MCS of the transmitter through modulation and coding scheme feedback (Modulation and Coding Scheme Feedback, MFB) of the receiver is a typical representative of the link adaptation technology.

The conventional wireless local area network system supports two feedback mechanisms: solicited feedback and unsolicited feedback. Solicited feedback means that after the transmitter sends a modulation and coding scheme request (MCS Request, MRQ) to the receiver, the receiver performs MFB with respect to the data of the previous frame sent by the transmitter; unsolicited feedback means that the receiver actively performs MFB, without requiring the transmitter to send a request. The unsolicited feedback may relate to the data of any one frame or multiple frames sent by the transmitter previously.

In the current new wireless local area network standard, a high throughput control field (High Throughput, HT, Control field) is introduced, and is used for link adaptation feedback, RDG (Reverse Direct Grant) indication, and so on. In the new standard, a similar control field is required to implement the functions. However, no new very high throughput control field (Very High Throughput, VHT, Control field) is defined at present, and the HT Control field is reused. Specifically, the first bit B0 that is originally a reserved bit in the HT Control field is used to differentiate two modes. When B0=0, it indicates that the current field is an HT Control field in the HT format (HT format HT Control field); when B0=1, it indicates that the current field is an HT Control field in the VHT format (VHT format HT Control field).

However, for the VHT format HT Control field, the reuse technology decreases the reserved bit, which is unfavorable for subsequently introducing newer technologies.

SUMMARY

Embodiments of the present disclosure are intended to mitigate the current latent application conflict that may be generated by the introduction of new technologies and take the introduction of subsequent more new technologies into account, and optimize the application of the VHT format HT Control field to obtain more reserved bits.

A first link adaptation feedback method provided by an embodiment of the present disclosure includes:

receiving, by a transmitting device, a link adaptation feedback frame sent by a communication peer end, where the link adaptation feedback frame includes a modulation and coding scheme request sequence identifier (MSI), where the MSI includes three bits, and the MSI is configured to send a link adaptation request to the communication peer end and is further configured to indicate space-time block coding type (STBC) indication information; and performing, by the transmitting device, link adaptation processing according to the link adaptation feedback frame, where the transmitting device determines, according to the space-time block coding type indication information, information about use of space-time block coding by a data frame related to the link adaptation feedback frame, and selects, according to the use information, a space-time stream, bandwidth, and modulation and coding scheme used when the transmitting device sends a data frame.

A second link adaptation feedback method provided by an embodiment of the present disclosure includes:

receiving, by a transmitting device, a link adaptation feedback frame sent by a communication peer end, where the link adaptation feedback frame includes a modulation and coding scheme request sequence identifier (MSI), where the MSI includes three bits, and the MSI is configured to send a link adaptation request to the communication peer end and is further configured to carry a drop eligibility indicator (DEI); and performing, by the transmitting device, link adaptation processing according to the link adaptation feedback frame, where a data frame received from the communication peer end is dropped according to the DEI, and the data frame and the link adaptation feedback frame are sent by the communication peer end as one frame.

A third link adaptation feedback method provided by an embodiment of the present disclosure includes:

receiving, by a transmitting device, a link adaptation feedback frame sent by a communication peer end, where the link adaptation feedback frame includes a modulation and coding scheme request sequence identifier (MSI), where the MSI includes three bits, and the MSI is configured to send a link adaptation request to the communication peer end and at least one bit in the MSI is a link standard information bit configured to indicate a communication standard used for communication between the transmitting device and a peer device; and performing, by the transmitting device, link adaptation processing according to the link adaptation feedback frame as specified by the communication standard.

A fourth link adaptation feedback method provided by an embodiment of the present disclosure includes:

receiving, by a transmitting device, a link adaptation feedback frame sent by a communication peer end, where the link adaptation feedback frame includes an extended indication bit, and when the extended indication bit indicates that the link adaptation feedback frame is an extended link adaptation feedback frame, the extended link adaptation feedback frame includes extended bits, where at least one bit of the extended bits is configured to indicate space-time block coding type indication information; and performing, by the transmitting device, link adaptation processing according to the link adaptation feedback frame, where the transmitting device determines, according to the space-time block coding type indication information, information about use of space-time block coding by a data frame related to the link adaptation feedback frame, and selects, according to the use information, a space-time stream, bandwidth, and modulation and coding scheme used when the transmitting device sends a data frame.

A fifth link adaptation feedback method provided by an embodiment of the present disclosure includes:

receiving, by a transmitting device, a link adaptation feedback frame sent by a communication peer end, where the link adaptation feedback frame includes an extended indication bit, and when the extended indication bit indicates that the link adaptation feedback frame is an extended link adaptation feedback frame, the extended link adaptation feedback frame includes extended bits, where at least one bit of the extended bits is configured to carry a drop eligibility indicator (DEI); and performing, by the transmitting device, link adaptation processing according to the link adaptation feedback frame, where a data frame received from the communication peer end is dropped according to the DEI, and the data frame and the link adaptation feedback frame are sent by the communication peer end as one frame.

A sixth link adaptation feedback method provided by an embodiment of the present disclosure includes:

receiving, by a transmitting device, a link adaptation feedback frame sent by a communication peer end, where the link adaptation feedback frame includes an extended indication bit, and when the extended indication bit indicates that the link adaptation feedback frame is an extended link adaptation feedback frame, the extended link adaptation feedback frame includes extended bits, where at least one bit of the extended bits is a link standard information bit configured to indicate a communication standard used for communication between the transmitting device and a peer device; and performing, by the transmitting device, link adaptation processing according to the link adaptation feedback frame as specified by the communication standard.

Further, an embodiment of the present disclosure provides a transmitting device, including:

an adaptation link frame generating module, configured to generate an adaptation link feedback frame, where the adaptation link frame may be the adaptation link frame described in the above embodiments; and a sending module, configured to send the adaptation link frame generated by the adaptation link frame generating module, where the adaptation link frame is used by a communication peer end receiving the adaptation link frame for performing link adaptation according to the adaptation link frame.

With the embodiments of the present disclosure, the transmitting device receives the link adaptation feedback frame sent by the receiving device, where the link adaptation feedback frame carries more information by processing the MSI bit or introducing extended bits; the application of the VHT format HT Control field is optimized. Thereby, the current latent application conflict that may be generated by the introduction of new technologies can be mitigated and more reserved bits can be obtained.

BRIEF DESCRIPTION OF THE DRAWINGS

FIG. 1 is an indication diagram of a VHT format HT Control field according to a first embodiment;

FIGS. 2, 2a, and 2b are indication diagrams of a VHT format HT Control field according to a third embodiment;

DETAILED DESCRIPTION OF THE EMBODIMENTS

Figure 2A:
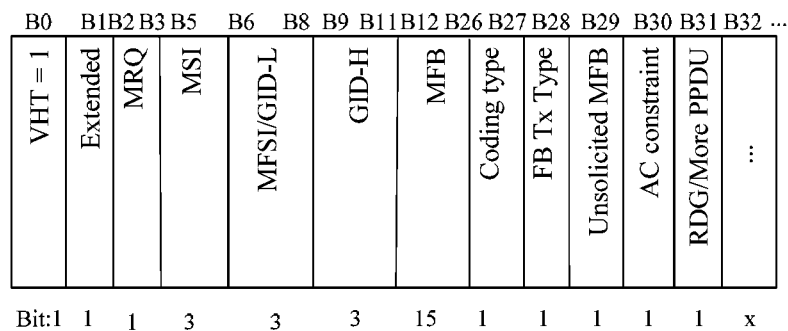

In a wireless communication system, due to applications of a MIMO (multiple-input multiple-output) technology and a beamforming technology, channel information becomes indispensable. A beamformer obtains channel information by receiving the feedback of a beamformee, and uses the channel information as a reference for subsequently sending data.

Embodiments of the present disclosure are intended to mitigate the current latent application conflict that may be generated by the introduction of new technologies and take the introduction of subsequent more new technologies into account, and optimize the application of the VHT format HT Control field to obtain more reserved bits.

FIG. 1 is an indication diagram of a VHT format HT Control field according to a first embodiment. B0 is set to 1, indicating a VHT format; the bit B1 is a reserved bit; B2 to B5 are used for a link adaptation request; B6 to B29 are used for link adaptation feedback; B30 to B31 are used for an RDG indication.

Still referring to FIG. 1, the VHT format HT Control field includes a VHT field, a reserved field, an MRQ field, an MRQ sequence identifier (MRQ Sequence Identifier, MSI) field, an MFB sequence identifier (MFB Sequence Identifier, MFSI)/least significant bits of group identifier (Least Significant Bits of Group Identifier, GID-L) field, an MFB subfield, a most significant bits of group identifier (Most Significant Bits of Group Identifier, GID-H) field, a coding type (Coding Type) field, a feedback transmission type (Feedback Tx Type, FB Tx Type) field, an unsolicited (Unsolicited) MFB field, an access category constraint (Access Category Constraint, AC Constraint) field, and a reverse direct grant (Reverse Direct Grant, RDG)/more physical layer convergence procedure protocol data unit (More Physical Layer Convergence Procedure Protocol Data Unit, More PPDU) field.

The FB Tx Type field indicates whether the transmitting device uses beamforming when sending a data frame in case of unsolicited feedback; "0" indicates that beamforming is not used, and "1" indicates that beamforming is used.

The MFB subfield (B9 to B23) includes the space-time stream, bandwidth, and MCS recommended by the receiving device, the signal to noise ratio (Signal to Noise Ratio, SNR) estimated by the receiving device, and so on. FIG. 1 is a schematic diagram of a format of an MFB subfield according to an embodiment of the present disclosure. As shown in FIG. 1, the MFB subfield may include a field indicating the number of space-time streams (Number of Space-Time Streams, N_STS) in the very high throughput (Very High Throughput, VHT) format, an MCS field, a bandwidth (Bandwidth, BW)

field, and an SNR field. The receiving device carries the space-time streams recommended by the receiving device in the VHT N_STS field, carries the MCS recommended by the receiving device in the MCS field, carries the BW recommended by the receiving device in the BW field, and carries the SNR estimated by the receiving device in the SNR field.

However, the above VHT format HT Control field includes no information for indicating whether the transmitting device uses space-time block coding (STBC) when sending a data frame, but only indicates whether beamforming is used. Actually, whether STBC is used has no necessary association with whether beamforming is used, that is, when beamforming is used, STBC may also be used; when beamforming is not used, STBC is not necessarily used. However, on condition that beamforming is not used, using STBC can obtain more transmit diversity gains (at least 3 dB). Therefore, whether beamforming is used and whether STBC is used both affect the content carried by the MFB subfield, and further affect the transmitting device to select the space-time stream, bandwidth, and MCS used when the transmitting device sends a data frame.

However, only one reserved bit is available in the embodiment, which is not enough for the indication of multiple latent new technologies and extension of subsequent standards. Further, the VHT format HT Control field has no information for indicating whether the transmitting device uses STBC when sending a data frame, so that the transmitting device cannot properly select the space-time streams, bandwidth, and MCS used when the transmitting device sends the data frame, thereby reducing the effect of link adaptation.

Further, the indication mode of the MSI (MRQ sequence identifier) field is modified in the second embodiment of the present disclosure, including three bits B3 to B5 in total. The MSI in FIG. 1 is a field inherited from the HT format HT Control field. In the HT format HT Control field, the MSI may be any integer value among 0 to 6, used to indicate particular link adaptation feedback, and the state MSI=7 is specifically used to indicate unsolicited MFB. If the usage of the MSI in the HT format HT Control field is inherited, the MSI in the VHT format HT Control field may also be any integer value among 0 to 6, used to indicate particular link adaptation feedback, and the state MSI=7 is reserved. Because the Unsolicited MFB field is added to the VHT format HT Control field and can be used to differentiate the MFB on request and the unsolicited MFB, the value range of the MSI may be extended to any integer among 0 to 7. The following is a modification scheme of another embodiment of the present disclosure, and the specific mode is as follows: using part of the bits in the MSI to indicate new applications. Herein, part of bits may be one or multiple bits. One bit is used to indicate new applications in the following example. The new applications may include one or multiple of a new standard version indication, a DEI indication, or an STBC indication during link adaptation feedback. However, the new applications are not merely limited to these several new applications. In case of a new standard version indication, the bit is a link standard information bit, used to indicate the communication standard (for example, UVHT) used for communication between the transmitting device and the peer device.

Though part of bits of the MSI are used to indicate other new applications, the total number of bits of the MSI does not change, that is, the bits used to indicate the new applications still belong to the MSI field.

In the embodiment, the specific implementation mode for using part of bits of the MSI to indicate new applications may be as follows:

The following example assumes that the value of the MSI ranges from 0 to 7. If the value of the MSI is set to 0 to 6 as the practice in the HT format HT Control field, the bit B5 in the following example may be modified to the bit B3 or B4.

If the new application to be indicated is an STBC indication in the link adaptation process, one bit (for example, B5) may be used as an indication. If the feedback type is unsolicited feedback set to the first value (unsolicited MFB=1), when the STBC indication is the first value (B5=0), the feedback content means the PPDU does not use STBC; when the STBC indication is the second value (B5=1), the feedback content means the PPDU uses STBC. The values of two other bits in the MSI may be any integer of 0 to 3. If the feedback type is unsolicited feedback set to the second value (unsolicited MFB=0), the bit B5 is only used to indicate part of the MSI, and is irrelevant to whether the PPDU uses STBC as indicated by the feedback content.

If the new application to be indicated is a DEI indication, one bit (for example, B5) may be used as an indication. When B5=0, it indicates that the content of the current frame is not suitable for dropping; when B5=1, it indicates that the current frame is suitable for dropping. When the resources of the receiver STA are insufficient, the frame whose B5=1 can be dropped preferentially. The values of two other bits in the MSI may be any integer of 0 to 3.

If the new standard version is indicated, for example, the next-generation WiFi standard (for example, UVHT) needs to be indicated, one bit (for example, B5) may be used as an indication. In this case, the bit is a link standard information bit, used to indicate the communication standard (for example, UVHT) used for communication between the transmitting device and the peer device. If B0=1, when B5=0, it indicates that the current field is a VHT format HT Control field; when B5=1, it indicates that the current field is a UVHT format HT Control field. The values of two other bits in the MSI may be any integer of 0 to 3.

Further, if the new application to be indicated is an STBC indication in the link adaptation process, one bit (for example, B5) may be used as an indication. If the feedback type is unsolicited feedback set to the first value (unsolicited MFB=1), when the STBC indication is the first value (B5=0), the feedback content means the PPDU does not use STBC or it is recommended (or suggested) that the transmitter should not use STBC; when the STBC indication is the second value (B5=1), the feedback content means the PPDU uses STBC or it is recommended that the transmitter should use STBC. The values of two other bits in the MSI may be any integer of 0 to 3. If the feedback type is unsolicited feedback set to the second value (unsolicited MFB=0), when B5=0, it is recommended that the transmitter should not use STBC; when B5=1, it is recommended the transmitter should use STBC, or the bit B5 is only used to indicate part of the MSI and is irrelevant to whether the PPDU uses STBC as indicated by the feedback content.

In actual applications, the similar function and effect may still be achieved if the value of a field is correspondingly negated in each embodiment.

FIG. 2 is an indication diagram of a VHT format HT Control field according to a third embodiment. In the third embodiment, the reserved bit B1 in the first embodiment is used as an extended indication bit, used to indicate whether to extend the VHT format HT Control field. One indication mode is as follows: When B1=0, it indicates that no extension is performed, that is, maintaining the same bit length as the HT format HT Control field; when B1=1, it indicates that extension is performed, and in this case, several bits (for example, 16 bits or 32 bits) may be added after B31, and the added bits belong to the VHT format HT Control field and may be used to indicate any new application.

In the embodiment, the usage of the extended bit may be as follows:

One bit (for example, B32) may be used as an STBC indication in the link adaptation process. When the feedback type is unsolicited feedback (unsolicited MFB=1), if B32=0, the feedback content means the PPDU does not use STBC, if B32=1, the feedback content means the PPDU uses STBC. When the feedback type is feedback on request (unsolicited MFB=0), B32 is a reserved bit.

One bit (for example, B33) may be used as a DEI indication. When B33=0, it indicates that the content of the current frame is not suitable for dropping; when B33=1, it indicates that the current frame is suitable for dropping. When the resources of the receiver STA are insufficient, the frame whose B33=1 can be dropped preferentially.

One bit (for example, B34) may be used as an indication of a future standard version (for example, UVHT). If B0=1, when B34=0, it indicates that the current field is a VHT format HT Control field; when B34=1, it indicates that the current field is a UVHT format HT Control field.

Figure 2B:
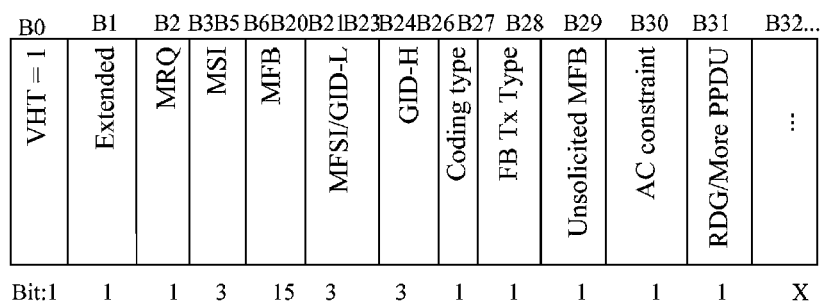

If some fields in the original VHT format HT Control field are adjusted to other positions or modified for convenient implementation or easier understanding, the implementation of the embodiment is not affected, and for several specific examples, reference may be made to FIG. 2*a* and FIG. 2*b*.

Further, one bit (for example, B32) may be used as an STBC indication in the link adaptation process. When the feedback type is unsolicited feedback (unsolicited MFB=1), if B32=0, the feedback content means the PPDU does not use STBC, or it is recommended that the transmitter should not use STBC; if B32=1, the feedback content means the PPDU uses STBC or it is recommended the transmitter should use STBC. When the feedback type is feedback on request (unsolicited MFB=0), if B32=0, it is recommended that the transmitter should not use STBC; if B32=1, it is recommended that the transmitter should use STBC, or B32 is a reserved bit.

Figure 3:
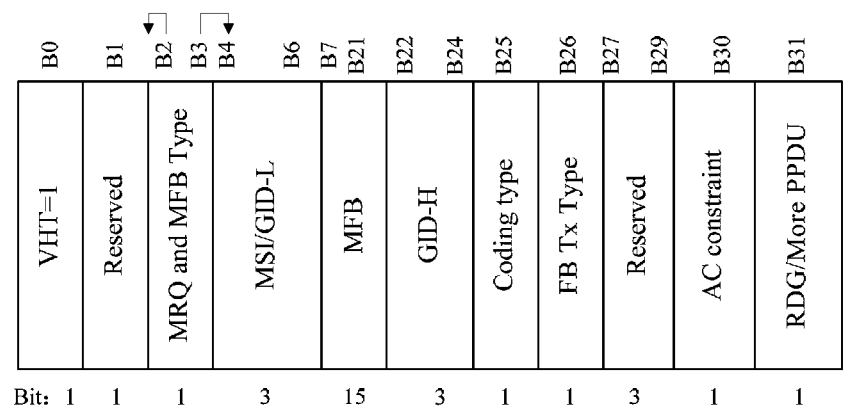
FIGS. 3, 3a, and 3b are indication diagrams of a VHT format HT Control field according to a fourth embodiment.
Figure 4:
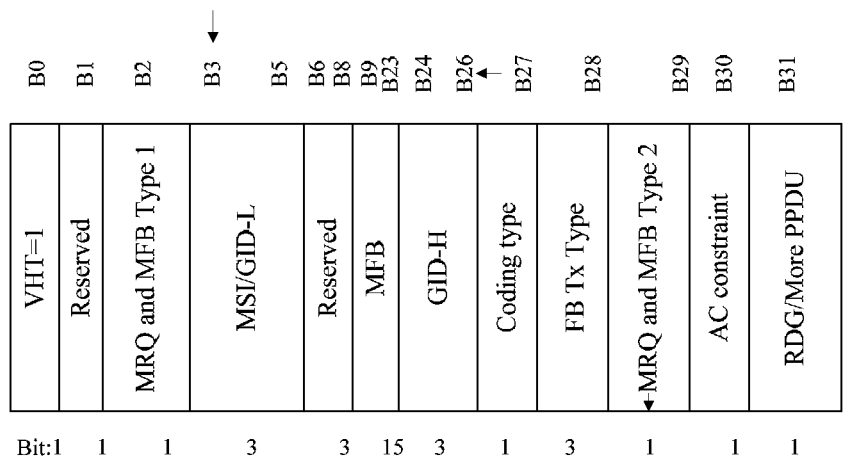
FIG. 4 is an indication diagram of a VHT format HT Control field according to a fifth embodiment.

FIG. 3 is an indication diagram of a VHT format HT Control field according to a fourth embodiment. In the fourth embodiment, the MRQ field (B2) and the Unsolicited MFB field (B29) in the first embodiment are combined into an "MRQ and MFB Type" field, used to indicate that the current frame is a link adaptation request or used to indicate a feedback type, for example, 0 indicates a link adaptation request, 1 indicates link adaptation feedback on request, 2 indicates unsolicited link adaptation feedback, and 3 is a reserved state. For clearer description in FIG. 3, B29 in FIG. 1 is moved to the position of B3, so that two bits of the "MRQ and MFB Type" field are connected together, but actually, the positions may also not change. Referring to FIG. 4, the MRQ and MFB Type field is divided into two parts: B2 and B29, respectively represented by MRQ and MFB Type1, and MRQ and MFB Type2.

In the fourth embodiment, because the link adaptation request and the link adaptation feedback are not indicated in the same VHT format HT Control field, the MSI field (B3 to B5) and the MFSI/GID-L field (B6 to B8) are not used at the same time. In the embodiment, one field may be used as an indication, herein called an "MSI/GID-L" field (including 3 bits). When the "MRQ and MFB Type" field indicates a link adaptation request, the "MSI/GID-L" field indicates a requested MSI sequence; when the "MRQ and MFB Type" field indicates link adaptation feedback on request, the "MSI/GID-L" field indicates the returned MSI sequence; when the "MRQ+MFB Type" field indicates unsolicited link adaptation feedback, the "MSI/GID-L" field indicates the three least significant bits of a group identifier. The 3 bits remaining after the MSI field and the MFSI/GID-L field are combined become reserved bits, and may be used for indicating any other new technology. For example, the new applications herein may include one or multiple of a new standard version indication (as a link standard information bit), a DEI indication, and an STBC indication during link adaptation feedback. However, the new applications are not merely limited to these several new applications.

In the embodiment, the usage of the reserved bit saved in the embodiment shown in FIG. 3 may be as follows:

One bit (for example, B27) may be used as an STBC indication in the link adaptation process. When the feedback type is unsolicited feedback (unsolicited MFB=1), if B27=0, the feedback content means the PPDU does not use STBC, if B27=1, the feedback content means the PPDU uses STBC. When the feedback type is feedback on request (unsolicited MFB=0), B27 is a reserved bit.

One bit (for example, B28) may be used as a DEI indication. When B28=0, it indicates that the content of the current frame is not suitable for dropping; when B28=1, it indicates that the current frame is suitable for dropping. When the resources of the receiver STA are insufficient, the frame whose B28=1 can be dropped preferentially.

One bit (for example, B29) may be used as an indication of a future standard version (for example, UVHT). In this case, the bit is a link standard information bit, used to indicate the communication standard (for example, UVHT) used for communication between the transmitting device and the peer device. If B0=1, when B29=0, it indicates that the current field is a VHT format HT Control field; when B29=1, it indicates that the current field is a UVHT format HT Control field.

Further, one bit (for example, B27) may be used as an STBC indication in the link adaptation process. When the feedback type is unsolicited feedback (unsolicited MFB=1), if B27=0, the feedback content means the PPDU does not use STBC, or it is recommended that the transmitter should not use STBC; if B27=1, the feedback content means the PPDU uses STBC or it is recommended the transmitter should use STBC. When the feedback type is feedback on request (unsolicited MFB=0), if B32=0, it is recommended that the transmitter should not use STBC; if B32=1, it is recommended the transmitter should use STBC, or B27 is a reserved bit.

Figure 3A:
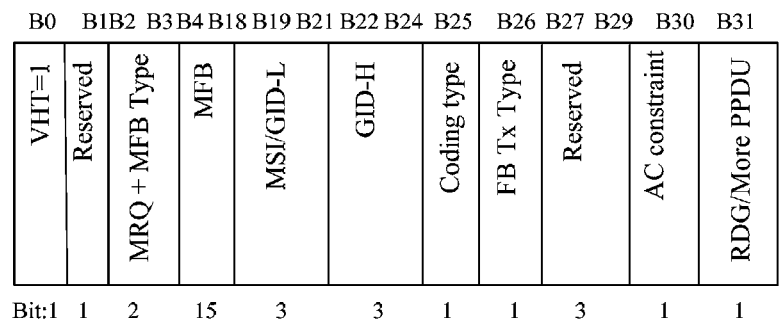
Figure 3B:
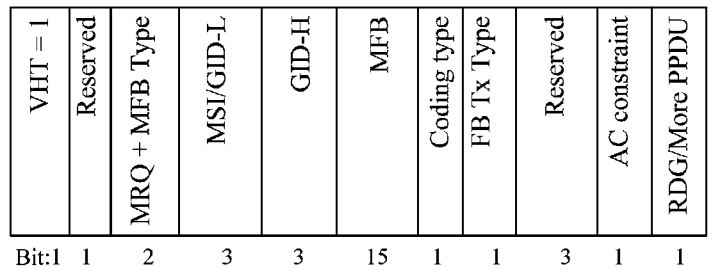

If some fields in the original VHT format HT Control field are adjusted to other positions or modified for convenient implementation or easier understanding, the implementation of the embodiment is not affected, and for several specific examples, reference may be made to FIG. 3*a* and FIG. 3*b*.

FIG. 4 is an indication diagram of a VHT format HT Control field according to a fifth embodiment. The design principle of the embodiment is the same as that of the fourth embodiment, but the field may be changed a little. The difference between the fifth embodiment and the fourth embodiment lies in dividing the "MRQ and MFB Type" field into two inconsecutive fields B2 and B29, respectively called an "MRQ and MFB Type1" field and an "MRQ and MFB Type2" field. In the fifth embodiment, the "MRQ and MFB Type1" field and the "MRQ and MFB Type2" field may be indicated in the same way as the "MRQ and MFB Type" field in the fourth embodiment. In the embodiment, after the MSI field (B3 to B5) field and the MFSI/GID-L field (B6 to B8) are combined into an "MSI/GID-L" field, the "MSI/GID-L" field may be placed in B3 to B5, while B6 to B8 are used as reserved bits; or the "MSI/GID-L" field is placed in B6 to B8, while B3 to B5 are used as reserved bits.

Further, the embodiment of the present disclosure provides a link adaptation feedback method. The VHT format HT Control field in the above embodiments is used in the link adaptation feedback, and the frame carrying the VHT format HT Control field is a link adaptation feedback frame. Using the VHT format HT Control field of the above embodiments may increase the information carried by the link adaptation feedback frame and improve the capability of link adaptation.

When different link adaptation feedback frames are used, the following different link adaptation feedback methods may be available. In the practical application, the following methods may be used separately, or may be combined with each other.

The first embodiment of link adaptation feedback includes the following steps:

S101. A transmitting device receives a link adaptation feedback frame sent by a communication peer end, where the link adaptation feedback frame includes a modulation and coding scheme request sequence identifier (MSI), where the MSI includes three bits, and the MSI is configured to send a link adaptation request to the communication peer end and is further configured to indicate space-time block coding type indication information.

S102. The transmitting device performs link adaptation processing according to the link adaptation feedback frame, where the transmitting device determines, according to the space-time block coding type indication information, information about use of space-time block coding by a data frame related to the link adaptation feedback frame, and selects, according to the use information, a space-time stream, bandwidth, and modulation and coding scheme used when the transmitting device sends a data frame.

In the embodiment, the MSI field may be the fourth to sixth bits of the adaptation feedback frame, namely, B3 to B5.

The second embodiment of link adaptation feedback includes the following steps:

S201. A transmitting device receives a link adaptation feedback frame sent by a communication peer end, where the link adaptation feedback frame includes a modulation and coding scheme request sequence identifier (MSI), where the MSI includes three bits, and the MSI is configured to send a link adaptation request to the communication peer end and is further configured to carry a drop eligibility indicator (DEI).

S202. The transmitting device performs link adaptation processing according to the link adaptation feedback frame, where a data frame received from the communication peer end is dropped according to the DEI, and the data frame and the link adaptation feedback frame are sent by the communication peer end as one frame.

In the embodiment, the MSI field may be the fourth to sixth bits of the adaptation feedback frame, namely, B3 to B5.

The third embodiment of link adaptation feedback includes the following steps:

S301. A transmitting device receives a link adaptation feedback frame sent by a communication peer end, where the link adaptation feedback frame includes a modulation and coding scheme request sequence identifier (MSI), where the MSI includes three bits, and the MSI is configured to send a link adaptation request to the communication peer end and at least one bit in the MSI is a link standard information bit configured to indicate a communication standard used for communication between the transmitting device and a peer device.

S302. The transmitting device performs link adaptation processing according to the link adaptation feedback frame as specified by the communication standard.

In the embodiment, the MSI field may be the fourth to sixth bits of the adaptation feedback frame, namely, B3 to B5.

The fourth embodiment of link adaptation feedback includes the following steps:

S401. A transmitting device receives a link adaptation feedback frame sent by a communication peer end, where the link adaptation feedback frame includes an extended indication bit, and when the extended indication bit indicates that the link adaptation feedback frame is an extended link adaptation feedback frame, the extended link adaptation feedback frame includes extended bits, where at least one bit of the extended bits is configured to indicate space-time block coding type indication information.

S402. The transmitting device performs link adaptation processing according to the link adaptation feedback frame, where the transmitting device determines, according to the space-time block coding type indication information, information about use of space-time block coding by a data frame related to the link adaptation feedback frame, and selects, according to the use information, a space-time stream, bandwidth, and modulation and coding scheme used when the transmitting device sends a data frame.

The fifth embodiment of link adaptation feedback includes the following steps:

S501. A transmitting device receives a link adaptation feedback frame sent by a communication peer end, where the link adaptation feedback frame includes an extended indication bit, and when the extended indication bit indicates that the link adaptation feedback frame is an extended link adaptation feedback frame, the extended link adaptation feedback frame includes extended bits, where at least one bit of the extended bits is configured to carry a drop eligibility indicator (DEI).

S502. The transmitting device performs link adaptation processing according to the link adaptation feedback frame, where a data frame received from the communication peer end is dropped according to the DEI, and the data frame and the link adaptation feedback frame are sent by the communication peer end as one frame.

The sixth embodiment of link adaptation feedback includes the following steps:

S601. A transmitting device receives a link adaptation feedback frame sent by a communication peer end, where the link adaptation feedback frame includes an extended indication bit, and when the extended indication bit indicates that the link adaptation feedback frame is an extended link adaptation feedback frame, the extended link adaptation feedback frame includes extended bits, where at least one bit of the extended bits is a link standard information bit configured to indicate a communication standard used for communication between the transmitting device and a peer device.

S602. The transmitting device performs link adaptation processing according to the link adaptation feedback frame as specified by the communication standard.

With the embodiments of the present disclosure, the transmitting device receives the link adaptation feedback frame sent by the receiving device, where the link adaptation feedback frame carries more information by processing the MSI bit or introducing extended bits; the application of the VHT format HT Control field is optimized Thereby, the current latent application conflict that may be generated by the introduction of new technologies can be mitigated and more reserved bits can be obtained.

Persons of ordinary skill in the art may understand that all or part of the steps in the method embodiments can be implemented by hardware under the instruction of a program. The program may be stored in a computer readable storage medium and when the program is executed, the steps in the method embodiments are executed. The storage medium may be any medium that can store program codes, such as a ROM, a RAM, a magnetic disk, or a CD-ROM.

An embodiment of the present disclosure also provides a transmitting device. The transmitting device in the embodiment may implement the procedure of the above method embodiments and generation of the adaptation link frame in each embodiment. The transmitting device in the embodiment of the present disclosure may be an access point (Access Point, AP) in the wireless local area network. In the wireless local area network, the beamformer (beamformer) obtains channel information and link information by receiving the feedback of the beamformee (beamformee). As shown in FIG. 4, the transmitting device may include:

an adaptation link frame generating module, configured to generate an adaptation link frame, where the adaptation link frame may be the adaptation link frame described in the above embodiments; and a sending module, configured to send the adaptation link frame generated by the adaptation link frame generating module, where the adaptation link frame is used by a communication peer end receiving the adaptation link frame for performing link adaptation according to the adaptation link frame.

With the embodiments of the present disclosure, by using the link adaptation frame in each embodiment of the present disclosure, the link adaptation feedback frame sent by the receiving device is received, where the link adaptation feedback frame carries more information by processing the MSI bit or introducing extended bits; the application of the VHT format HT Control field is optimized Thereby, the current latent application conflict that may be generated by the introduction of new technologies can be mitigated and more reserved bits can be obtained.

Those skilled in the art may understand that the modules in the devices provided in the embodiments may be arranged in the devices in a distributed manner according to the description of the embodiments, or may be arranged in one or multiple devices which are different from those described in the embodiments. The modules according to the above embodiments may be combined into one module, or split into multiple submodules.

What is claimed is:

1. A link adaptation feedback method, comprising:
receiving, by a device, a link adaptation feedback frame sent by a peer end communications device, wherein the link adaptation feedback frame comprises a modulation and coding scheme request sequence identifier (MSI) comprising three bits, wherein one bit of the three bits in the MSI is used to indicate space-time block coding (STBC) information, and the space-time block coding information is used to indicate whether a data frame related to the link adaptation feedback frame uses space-time block coding.

2. The link adaptation feedback method according to claim 1, wherein:
when a value of the one bit is set to 1, it indicates that the data frame related to the link adaptation feedback frame uses the space-time block coding.

3. The link adaptation feedback method according to claim 1, wherein:
when a value of the one bit is set to 0, it indicates that the data frame related to the link adaptation feedback frame does not use the space-time block coding.

4. The link adaptation feedback method according to claim 1, wherein the MSI is further used to indicate a link adaptation request.

5. A device, comprising:
a receiving unit, configured to receive a link adaptation feedback frame sent by a peer end communications device, wherein the link adaptation feedback frame comprises a modulation and coding scheme request sequence identifier (MSI) comprising three bits, wherein one bit of the three bits in the MSI is used to indicate space-time block coding (STBC) information, and the space-time block coding information is used to indicate whether a data frame related to the link adaptation feedback frame uses space time block coding.

6. The device according to claim 5, wherein:
when a value of the one bit is set to 1, it indicates that the data frame related to the link adaptation feedback frame uses the space-time block coding.

7. The device according to claim 5, wherein:
when a value of the one bit is set to 0, it indicates that the data frame related to the link adaptation feedback frame does not use the space-time block coding.

8. The device according to claim 5, wherein the MSI is further used to indicate a link adaptation request.

9. A link adaptation feedback method, comprising:
sending, by a peer end communications device, a link adaptation feedback frame to a device, wherein the link adaptation feedback frame comprises a modulation and coding scheme request sequence identifier (MSI) comprising three bits, wherein one bit of the three bits in the MSI is used to indicate space-time block coding (STBC) information, and the space-time block coding information is used to indicate whether a data frame related to the link adaptation feedback frame uses space time block coding.

10. The link adaptation feedback method according to claim 9, wherein:
when a value of the one bit is set to 1, it indicates that the data frame related to the link adaptation feedback frame uses the space-time block coding.

11. The link adaptation feedback method according to claim 9, wherein:
when a value of the one bit is set to 0, it indicates that the data frame related to the link adaptation feedback frame does not use the space-time block coding.

12. The link adaptation feedback method according to claim 9, wherein the MSI is further used to indicate a link adaptation request.

13. A peer end communication device, comprising:
a sending unit, configured to send a link adaptation feedback frame to a device, wherein the link adaptation feedback frame comprises a modulation and coding scheme request sequence identifier (MSI) comprising three bits, wherein one bit of the three bits in the MSI is used to indicate space-time block coding (STBC) information, and the space-time block coding information is used to indicate whether a data frame related to the link adaptation feedback frame uses space-time block coding.

14. The peer end communications device according to claim 13, wherein:
when a value of the one bit is set to 1, it indicates that the data frame related to the link adaptation feedback frame uses the space-time block coding.

15. The peer end communications device according to claim 13, wherein:

when a value of the one bit is set to 0, it indicates that the data frame related to the link adaptation feedback frame does not use the space-time block coding.

16. The peer end communications device according to claim 13, wherein the MSI is further used to indicate a link adaptation request.

* * * * *